United States Patent [19]
Baumgarten

[11] Patent Number: 6,014,986
[45] Date of Patent: Jan. 18, 2000

[54] VALVE FOR A COOKING UTENSIL

[75] Inventor: Gerd-Diethard Baumgarten, Wilnsdorf-Wilden, Germany

[73] Assignee: Heinrich Baumgarten KG Spezialfabrik fuer Beschlagteile, Neunkirchen, Germany

[21] Appl. No.: 09/200,260

[22] Filed: Nov. 25, 1998

[51] Int. Cl.[7] .............................. F16K 15/00; B65D 51/16
[52] U.S. Cl. ..................... 137/526; 137/854; 137/522; 220/203.07; 220/203
[58] Field of Search ..................... 137/526, 854, 137/852, 522; 220/203, 203.07, 203.04, 203.18, 203.29, 212.5, 231; 16/114 A, 121

[56] References Cited

U.S. PATENT DOCUMENTS

| | | | |
|---|---|---|---|
| 3,632,014 | 1/1972 | Basile | 220/44 R |
| 3,968,897 | 7/1976 | Rodgers | 137/854 |
| 4,051,975 | 10/1977 | Ohgida et al. | 220/203 |
| 4,103,801 | 8/1978 | Walker | 220/203 |
| 4,285,441 | 8/1981 | Ziskind | 220/231 |
| 4,301,826 | 11/1981 | Beckerer | 137/854 |
| 4,534,485 | 8/1985 | Subramanian | 220/203 |
| 4,560,143 | 12/1985 | Robinson | 220/203 |
| 4,579,141 | 4/1986 | Arff | 137/522 |
| 4,974,632 | 12/1990 | Ericson | 137/526 |
| 5,279,439 | 1/1994 | Kasugai et al. | 137/526 |
| 5,405,038 | 4/1995 | Chuang | 137/522 |
| 5,540,347 | 7/1996 | Griffin | 220/203.29 |
| 5,632,403 | 5/1997 | Deng | 220/203.04 |
| 5,715,743 | 2/1998 | Goddard | 220/212.5 |

*Primary Examiner*—Denise L. Ferensic
*Assistant Examiner*—Joanne Y. Kim
*Attorney, Agent, or Firm*—Flynn, Thiel, Boutell & Tanis, P.C.

[57] ABSTRACT

A valve, which opens upon a not permissible underpressure in a cooking utensil and upon a manual operation and which is stored in the lid of the cooking utensil suffices, without a valve spring and with a minimum of structural parts, when its flexible valve plate consists in one piece of a pressure part for manual operation and a seal collar, for abutment on a valve seat, and a connecting corpus therebetween. The seal collar is swivelled upon an overload on a swivel edge of the valve member and disengages from the abutment on the valve seat thus opening the valve.

21 Claims, 1 Drawing Sheet

VALVE FOR A COOKING UTENSIL

FIELD OF THE INVENTION

The invention relates to a valve for a cooking utensil, which can be closed off with a lid, comprising a valve member, which can be fastened on the cooking utensil and preferably on the lid, and which valve member has a valve seat, which cooperates with a valve plate blocking the valve until a predetermined or given underpressure.

BACKGROUND OF THE INVENTION

Cooking utensils are in use, which during operation are covered with a relatively tightly closing lid, so that when the heat supply to such a cooking utensil drops and the food cools off, an underpressure is formed inside of said cooking utensil and thus the cooking process of the food continues in an accelerated manner. Of course, care must be taken that the atmospheric pressure on the lid remains limited and that same cannot be deformed or even destroyed. Moreover, the possibility of bringing about a pressure balance relative to the outside must exist at any time in order to be able to remove the lid without any problems from the cooking utensil. A suitable safety and vent valve must therefore be provided in the cooking utensil.

It is already known, and it is also obvious, to equip such a valve with a valve spring, by the force of which spring a valve plate is loaded such that it rests on a valve seat and prevents, during normal operation, a pressure balance between the inside of the cooking utensil and the outside. The valve spring is increasingly loaded upon an increase in the underpressure until at an adjusted limit value it opens the valve and relieves the underpressure through the lid. Moreover a central, hand-operated pressure knob is integrated into the knoblike valve member, which as a rule is connected to the lid by means of a fastening thread, with which pressure knob the valve can be opened without any consideration of the accumulated underpressure.

Such a valve is rather complicated because the pressure knob must be mounted axially and limited with a screw connection. It is particularly disadvantageous that the valve can become dirty in the area of the valve spring constructed as a coil spring and its preadjusted spring force is thereby changed so that an automatic opening of the valve will no longer occur at the originally adjusted underpressure. Fastening of the valve member on the lid demands an additional work for sealing and holding a flange or the like fastened on the lid, into which the valve member can be screwed.

SUMMARY OF THE INVENTION

Thus the basic purpose of the invention is to design a valve of the above-described type in such a manner that it is less susceptible to breakdowns and consists of only a few structural parts, which are inexpensive to manufacture and to mount.

The purpose is attained according to the invention in such a manner that the valve plate has a seal collar, which is provided on its corpus, and extends around the corpus, is flexible and, when the valve is closed, rests on the valve seat, and at least one swivel edge, which is spaced from the valve seat, and is provided within an otherwise free flow cross section and approximately in the plane of the valve seat, is provided on the valve member for the seal collar, which can be placed against the swivel edge at a relatively small partial section of its circumference. The swivel edge is best provided on a free cam end of a stop cam starting out from the valve seat and pointing radially inwardly.

Thus the valve of the invention suffices without a special valve spring. No spring coils whatsoever are provided any longer, in which dirt particles could adhere. The spring function of the usually provided valve spring is instead realized by the form-changing work on the seal collar, which can be an integral part of the valve plate. It is understood that, on the other hand, the stop cam is also constructed in one piece on the valve member so that indeed structural parts, which must be manufactured separately and must be mounted separately, are no longer needed for the operation of the valve. The needed operating elements of the seal collar and of the stop cam are parts of the essential structural elements of the valve, thus of the valve member and of the valve plate. The swivel edge and the entire stop cam are thereby each provided just below the support surface of the valve seat, which, as is common in this technical field, is also provided in one piece on the valve member. The seal collar rests in this manner under a normal load of the valve plate sealingly on the valve seat. Upon an increasing overload, the seal collar moves into the area of the swivel edge and is pivoted at an increasing load about its clamping point on the corpus of the valve plate, whereby it is lifted off from the valve seat so that outside of the area of the stop cam, air can flow from the outside into the cooking utensil.

In particular, it is thereby advantageous when the swivel edge is constructed on the cam end as a rounded or bordered edge. A quickly increasing flow cross section is obtained by providing several swivel edges evenly distributed about the circumference of the valve seat, each of which, with the seal collar resting on the valve seat, should be slightly spaced therefrom so that the abutment of the seal collar on the valve seat, which occurs under normal operating conditions, is not disturbed or affected by the swivel edges.

A particularly advantageous embodiment of the invention provides that the valve member is constructed as a handle for the lid, and consists of a shaft resting on the lid and of a knoblike handle connected in one piece to the shaft. It is thereby advantageous when a central recess for the valve plate is provided in the handle on its slightly arched front face not facing the shaft. The valve plate can be very easily mounted in the valve member such that the essentially rotation-symmetrical valve plate has a pressure disk clamped in the recess, which pressure disk is connected in one piece with the disk-shaped seal collar through the center corpus, and is flush with a freely accessible operating area relative to the front face of the handle, which front face concentrically surrounds the pressure disk. The pressure disk is best clamped at its radial circumference on the outer surface of the recess and rests on a stop flange, which is formed by a first tapering of the recess. The valve can, in this manner, be directly manually operated, should this be necessary, for example, in order to relieve the lid and to open the cooking utensil. The seal collar is in this manner swivelled or swung, with the help of the pressure disk through the corpus of the valve plate, away from the valve seat just as this occurs during a nonpermissible underpressure in the cooking utensil. A slight press fit is sufficient for clamping of the pressure disk because, due to the underpressure during normal operation, the entire valve plate is loaded at any rate in the direction of the valve seat.

A second tapering of the recess can in a simple manner construct the valve seat, and the at least one stop cam is best constructed on this tapering. It is better yet when several stop cams are provided evenly distributed over the circumference of the valve seat In order for the pressure disk to permit air from the outside to flow into the valve and furthermore into the cooking utensil, at least one notch extending radially inwardly beyond the stop flange can be provided on the circumference of the pressure disk. Thus the atmospheric air pressure rests at all times on the seal collar of the valve plate on its side not facing the valve seat.

Even though a flexible seal collar separately mounted on the valve plate can also be provided, it is best when the valve plate consists throughout of an elastic material, thus including the seal collar so that, on the one hand, the valve plate can be manufactured easily and inexpensively and, on the other hand, the seal collar, after its relief or load alleviation, always assumes again the initial shape.

In order to fasten the valve member on the lid, it is advantageous when the shaft is connected to the lid by means of a bolt provided thereon, whereby the bolt consists of a bolt head welded to the lid and a threaded piece projecting from the lid, and a preferably metallic threaded sleeve is pressed in the main axis of the valve into the valve member, with which threaded sleeve it can be screwed onto the threaded piece. Such a fastening of the valve on the lid of the cooking utensil can easily be done cyclically and does not require any technical skills, rather it is essentially accessible for highly productive, high-output manufacturing.

A particularly preferred embodiment of the invention is thereby that the bolt can be centrally connected to the valve member by first its front face facing the lid having a recess, and the so formed shaft edge of the valve member resting on the lid, when the valve member is screwed to the bolt, and furthermore the recess being flow connected to the area piece constructed by the second tapering of the recess and containing the at least one stop cam through at least one axis-parallel passage, and at least one lid opening being provided in the lid, which opening flow-technically connects the inside of the cooking utensil to the recess. The recess surrounds the central bolt and in particular its bolt head is fixedly welded to the lid.

The entire valve member consists preferably of a plastic, which generally is comparatively nonelastic or contains little elastic in contrast to the valve plate, for which a flexible material, for example a rubber-elastic plastic, is advantageous.

DETAILED DESCRIPTION

Figure 1:
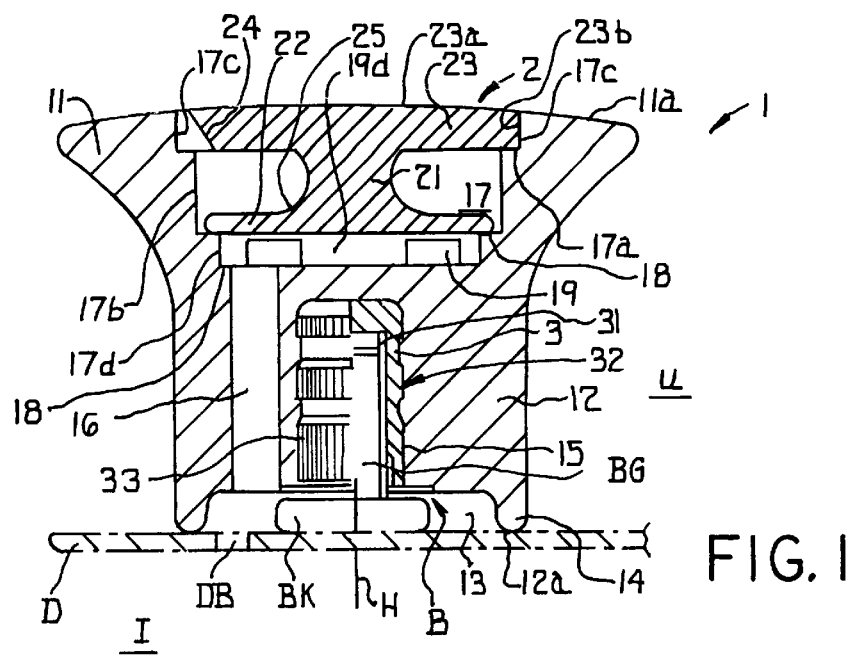
FIG. 1 is a center cross-sectional view of a valve according to the invention in its position of use in accordance with the cross-sectional line A—A in FIG. 2.

A valve corresponding to the invention consists according to FIG. 1 of a valve member 1, a valve plate 2 and a threaded sleeve 3, which is used to fasten the valve on a bolt B, which is fastened with its bolt head BK on a lid D of a cooking utensil, which lid is indicated in dash-dotted lines, by means of electric resistance spot welding. The lid D has a lid opening DB directly next to the bolt head BK, through which opening the inside I of the cooking utensil, with the valve open, is flow-technically connected to the outside U.

The valve member 1 is formed in such a manner that it can at the same time serve as a handle for the lid D, and it consists for this purpose in one piece of a knoblike handle 11 and a cylindrical shaft 12. The shaft 12 ends on its front face 12a opposite the handle 11 in a shaft edge 14 surrounding a recess 13 and, after the mounting of the valve, resting on the lid D. The lid opening DB is positioned such that it is covered neither by the bolt head BK nor by the shaft edge 14, and does not flow-connect the recess 13 nonblockably to the inside I of the cooking utensil.

The threaded sleeve 3 contains a center threaded bore 31 and is moreover dressed into a center clamping bore 15 extending into the shaft 12 and starting out from the recess 13. The outer surface 32 of the threaded sleeve 3 is for this purpose provided with knurlings 33 or similar fastening means. The valve member 1 is screwed with its threaded sleeve 3 onto a threaded piece BG of the bolt B, and is thereby tightened such that its shaft edge 14 seals off the recess 13 against the outside U.

A central, twice tapered recess 17 is recessed into the handle 11 on its front face 11a of the valve member 1, which front face does not face the lid D, in which recess 17 is arranged the valve plate 2.

The valve plate 2 consists of an axial, cylindrical corpus 21, on which are formed each with a larger diameter coaxially and in one piece on the one hand a seal collar 22 pointing into the recess 17 and on the other hand a pressure disk 23; a servicing area 23a of the pressure disk 23 closes off the valve plate 2 to the outside and is about flush with the front face 11a of the valve member 1. The pressure disk 23 abuts thereby an annular stop flange 17a, which is constructed by a first cylindrical tapering 17b of the recess 17. The pressure disk 23 is clamped with its circumference 23b on the outer surface 17c between the tapering 17b and the front face 11a.

Figure 3:
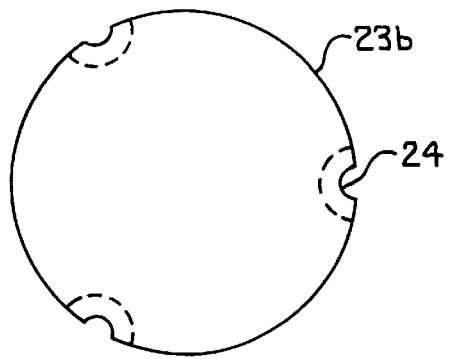
FIG. 3 is a top view of the valve plate of FIG. 1, all figures are shown in a schematic illustration.

A second cylindrical tapering 17d of the recess 17 together with the tapering 17b forms a circular-annular valve seat 18, on which rests the seal collar 22 of the valve plate 2 and interrupts the flow connection between the inside I of the cooking utensil and the outside U as long as the underpressure on the inside I has not fallen below a predetermined limit value or the pressure disk 23 is not manually stressed. Notches 24 (FIG. 3) on the circumference 23b of the pressure disk 23, which notches project over the first tapering 17b, take care not to block a flow connection between the outside U and the recess 17 in the area between the taperings 17b, 17d, thus between the seal collar 22 and the pressure disk 23.

Figure 2:
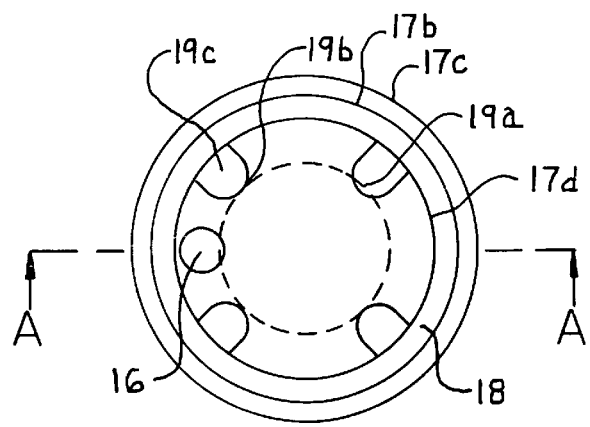
FIG. 2 is a top view of the valve in FIG. 1 in its center area, however, without the valve plate.

The second tapering 17d (FIG. 2) is interrupted by four stop cams 19, which are arranged evenly distributed over the circumference and are individually supported on the tapering 17d. They point, starting out from the tapering 17d, radially inwardly and end each in a semicircular front side cam end 19a, on which a swivel edge 19b is constructed. The swivel edge 19b is thereby simply the upper, slightly rounded edge of the cam end 19a and is used for swivelling the seal collar 22.

An upper cam surface 19c of the stop cam 19 is slightly spaced from the plane of the valve seat 18 such that the seal collar 22 does not rest on the stop cam 19 as long as the underpressure on the inside I has not fallen below a predetermined or pregiven limit value or the pressure disk 23 is not manually stressed. The stop cams 19 do not in this manner influence the function of the valve during normal operation.

When the force on the valve plate 2 exceeds the limit value, then the valve plate 2 moves in the direction of the valve seat 18, whereby the seal collar 22 approximately at its clamping point 25, at the corpus 21 comes toward the swivel edge 19b and is pivoted about same until it, at least in a partial area, is pivoted up from the valve seat 18, and thus the valve is opened, for which the area piece 19d between the stop cams 19 is flow-connected to the recess 13 through a passage 16 (FIG. 2), which is parallel to the main axis H of the valve.

List of reference numerals, which have been used 1 valve member
11 handle
11a front face
12 shaft
12a front face
13 recess
14 shaft edge
15 clamping bore
16 passage
17 recess
17a stop flange
17b (first) tapering
17c outer surface
17d (second) tapering
18 valve seat
19 stop cam
19a cam end
19b swivel edge
19c cam surface
19d area piece
2 valve plate
21 corpus
22 seal collar
23 pressure disk
23a servicing area
23b circumference
24 notch
25 clamping point
3 threaded sleeve
31 threaded bore
32 outer surface
33 knurling
B bolt
BG threaded piece
BK bolt head
D lid
DB lid opening
H main axis
I inside
U outside The embodiments of the invention in which an exclusive property or privilege is claimed are defined as follows:

1. A valve for a cooking utensil which can be closed off with a lid, the valve comprising a valve member, said valve member having a valve seat which cooperates with a valve plate blocking until a given underpressure, wherein;
 (a) the valve plate has a seal collar, which is provided on its corpus, and extends around said corpus, is flexible and, when the valve is closed, rests on the valve seat; and
 (b) at least one swivel edge, which is spaced from the valve seat, and is provided within an otherwise free open flow cross section and approximately in the plane of the valve seat, the swivel edge is provided on the valve member for the seal collar, the seal collar being capable of placement against the swivel edge at a relatively small partial section of its circumference.

2. The valve according to claim 1, wherein the swivel edge is provided on a free cam end of a stop cam starting out from the valve seat and pointing radially inwardly.

3. The valve according to claim 2, wherein the swivel edge is constructed on the cam end as a rounded edge.

4. The valve according to claim 1, wherein several swivel edges are provided evenly distributed about the circumference of the valve seat.

5. The valve according to claim 1, wherein the at least one swivel edge, when the seal collar rests on the valve seat, is slightly spaced from the seal collar.

6. The valve according to claim 1, wherein the valve member is constructed as a handle for the lid, and consists of a shaft resting on the lid and the handle comprises a knoblike handle connected in one piece to the shaft.

7. The valve according to claim 6, wherein a central recess for the valve plate is provided in the handle on a slightly arched front face not facing the shaft.

8. The valve according to claim 7, wherein the valve plate is essentially rotationally-symmetrical and has a pressure disk clamped in the recess, the pressure disk being connected in one piece with the seal collar through the center corpus, and the pressure disk being flush with a freely accessible operating area on the front face of the handle concentrically surrounding the pressure disk.

9. The valve according to claim 8, wherein the pressure disk is clamped at its radial circumference to the outer surface of the recess, and rests on a stop flange formed by a first tapering of the recess.

10. The valve according to claim 9, wherein a second tapering of the recess forms the valve seat.

11. The valve according to claim 10, wherein the at least one stop cam is constructed on the second tapering.

12. The valve according to claim 9, wherein at least one notch extending radially inwardly beyond the top flange is provided on the circumference of the pressure disk.

13. The valve according to claim 6, wherein the shaft is connected to the lid by a bolt provided on the lid.

14. The valve according to claim 13, wherein the bolt consists of a bolt head welded to the lid and a threaded piece projecting from the lid.

15. The valve according to claim 14, wherein a threaded sleeve is pressed along a main axis of the valve and into the valve member, with which the valve member having the threaded sleeve can be screwed onto the threaded piece.

16. The valve according to claim 13, wherein a front face of the valve member facing the lid has a recess, and an edge of the shaft rests on the lid when the valve member is screwed to the bolt.

17. The valve according to claim 16, wherein the recess is flow connected to an area piece constructed by a tapering of a second recess and containing the at least one stop cam through at least one passage.

18. The valve according to claim 16, wherein at least one lid opening is provided in the lid, the lid opening flow connects the inside of the cooking utensil to the recess.

19. The valve according to claim 1, wherein several stop cams are provided evenly distributed about the circumference of the valve seat, one of the stop cams having a swivel edge.

20. The valve according to claim 1, wherein the valve plate comprises an elastic material.

21. The valve according to claim 1, wherein the valve member comprises a generally nonelastic plastic.

* * * * *